US012712402B2

(12) United States Patent
Lessmann et al.

(10) Patent No.: US 12,712,402 B2
(45) Date of Patent: Aug. 18, 2026

(54) SEGMENTED COIL CARRIER WITH GROOVE WEDGES MADE OF MULTIPLE PIECES

(71) Applicant: Rolls-Royce Deutschland Ltd & Co KG, Blankenfelde-Mahlow (DE)

(72) Inventors: Marc Lessmann, Arnsberg (DE); Peter Gröppel, Erlangen (DE); Thomas Gleixner, Herzogenaurach (DE); Martin Thummet, Neunkirchen am Brand (DE); Markus Wild, Nuremberg (DE); Sunil Sreedharan, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 131 days.

(21) Appl. No.: 18/278,909

(22) PCT Filed: Feb. 21, 2022

(86) PCT No.: PCT/EP2022/054218
§ 371 (c)(1),
(2) Date: Aug. 25, 2023

(87) PCT Pub. No.: WO2022/179975
PCT Pub. Date: Sep. 1, 2022

(65) Prior Publication Data

US 2024/0136867 A1 Apr. 25, 2024
US 2024/0235284 A9 Jul. 11, 2024

(30) Foreign Application Priority Data

Feb. 25, 2021 (DE) ..................... 10 2021 201 793.2

(51) Int. Cl.
*H02K 1/14* (2006.01)
*H02K 3/487* (2006.01)
*H02K 15/022* (2025.01)

(52) U.S. Cl.
CPC ............. *H02K 1/148* (2013.01); *H02K 3/487* (2013.01); *H02K 15/022* (2013.01)

(58) Field of Classification Search
CPC ........... H02K 1/148; H02K 1/12; H02K 1/14; H02K 1/141; H02K 1/143; H02K 1/145;
(Continued)

(56) References Cited

U.S. PATENT DOCUMENTS 452,718 A * 5/1891 Riker ........................ H02K 1/14 310/216.011
893,711 A * 7/1908 Cushman ............... H02K 1/148 310/216.127

(Continued)

FOREIGN PATENT DOCUMENTS

DE 102013104392 A1 10/2014
DE 102018201446 A1 * 8/2019 ............. H02K 1/185
JP 2011101461 A 5/2011

OTHER PUBLICATIONS

German Search Report for Application No. DE 10 2021 201 793.2 mailed Dec. 6, 2021.

(Continued)

*Primary Examiner* — Maged M Almawri
(74) *Attorney, Agent, or Firm* — Lempia Summerfield Katz LLC

(57) ABSTRACT

The invention relates to a segmented coil carrier (20; 20') for an electric machine (2), comprising a plurality of separately formed, interconnected segments (1) with in each case one carrier (10) with a shaft (100) and a coil (11) surrounding the shaft (100), a groove (N) being formed between two adjacent carriers (10); and a groove wedge arranged in the groove (N).

17 Claims, 5 Drawing Sheets

(58) Field of Classification Search

CPC ........... H02K 1/146; H02K 1/16; H02K 1/18; H02K 1/182; H02K 1/185; H02K 1/187; H02K 1/06; H02K 15/022; H02K 3/522

USPC ............... 310/49.29, 254.1, 4, 126, 216.001, 310/216.113, 216.125–216.129, 310/216.131–216.137, 216.058

See application file for complete search history.

(56) References Cited

U.S. PATENT DOCUMENTS

| | | | | | |
|---|---|---|---|---|---|
| 932,537 | A * | 8/1909 | Cushman | H02K 23/22 | 310/216.096 |
| 1,005,858 | A * | 10/1911 | Lord | H02K 23/22 | 310/224 |
| 1,227,414 | A * | 5/1917 | Field | H02K 3/487 | 310/214 |
| 1,314,128 | A * | 8/1919 | Croll | H02K 1/141 | 310/216.031 |
| 1,756,672 | A * | 4/1930 | Barr | H02K 1/16 | 174/DIG. 20 |
| 1,835,120 | A * | 12/1931 | Poole | H01R 43/06 | 29/733 |
| 2,495,218 | A * | 1/1950 | Aske | H02K 15/021 | 29/609 |
| 2,736,829 | A * | 2/1956 | Sills | H02K 1/08 | 310/216.098 |
| 3,802,066 | A * | 4/1974 | Barrett | H02K 15/00 | 29/606 |
| 5,223,761 | A * | 6/1993 | Larsen | H02K 1/148 | 310/185 |
| 6,184,597 | B1 * | 2/2001 | Yamamoto | H02K 33/16 | 310/23 |
| 6,226,856 | B1 * | 5/2001 | Kazama | H02K 15/02 | 29/609 |
| 6,844,653 | B2 | 1/2005 | Kolomeitsev et al. | | |
| 6,960,861 | B2 * | 11/2005 | Yoneda | H02K 1/148 | 310/216.012 |
| 6,975,057 | B2 * | 12/2005 | Gauthier | H02K 11/21 | 310/262 |
| 7,042,130 | B2 * | 5/2006 | Zepp | H02K 1/148 | 310/216.102 |
| 7,247,967 | B2 * | 7/2007 | Lonel | H02K 3/28 | 310/216.086 |
| 7,592,727 | B1 * | 9/2009 | Doughty | H02K 49/046 | 310/105 |
| 8,319,389 | B2 * | 11/2012 | Haran | H02K 1/185 | 310/216.109 |
| 10,128,700 | B2 * | 11/2018 | Umeda | H02K 1/148 | |
| 10,224,766 | B2 * | 3/2019 | Senoo | H02K 1/141 | |
| 10,910,892 | B2 * | 2/2021 | Hirotani | H02K 3/48 | |
| 11,456,629 | B2 * | 9/2022 | Sato | H02K 1/148 | |
| 2002/0070629 | A1 * | 6/2002 | Dawson | H02K 1/12 | 310/216.051 |
| 2002/0074871 | A1 | 6/2002 | Kikuchi et al. | | |
| 2003/0052573 | A1 * | 3/2003 | Wischnewskiy | H02N 2/026 | 310/322 |
| 2003/0098628 | A1 * | 5/2003 | Enomoto | H02K 15/022 | 310/216.057 |
| 2003/0214197 | A1 | 11/2003 | De et al. | | |
| 2004/0189136 | A1 * | 9/2004 | Kolomeitsev | H02K 3/345 | 310/216.082 |
| 2006/0028087 | A1 * | 2/2006 | Ionel | H02K 1/148 | 310/216.086 |
| 2006/0279160 | A1 * | 12/2006 | Yoshinaga | H02K 1/148 | 310/216.049 |
| 2007/0247008 | A1 * | 10/2007 | Miyamoto | H02K 41/03 | 310/14 |
| 2008/0061653 | A1 * | 3/2008 | Sagara | H02K 1/148 | 310/254.1 |
| 2009/0140526 | A1 * | 6/2009 | Jansen | H02K 16/02 | 310/156.01 |
| 2009/0256438 | A1 * | 10/2009 | Ikeda | H02K 3/522 | 310/71 |
| 2010/0066199 | A1 * | 3/2010 | Shinagawa | H02K 1/148 | 310/216.113 |
| 2010/0090560 | A1 * | 4/2010 | Myojin | H02K 15/02 | 310/216.043 |
| 2011/0223045 | A1 * | 9/2011 | Sasaki | H02K 1/143 | 310/43 |
| 2013/0200742 | A1 * | 8/2013 | Seki | H02K 15/02 | 310/195 |
| 2014/0062249 | A1 * | 3/2014 | Nagao | B21D 53/00 | 310/216.089 |
| 2015/0364954 | A1 * | 12/2015 | Senoo | H02K 1/14 | 310/216.009 |
| 2016/0365756 | A1 * | 12/2016 | Li | H02K 15/02 | |
| 2017/0256995 | A1 * | 9/2017 | Lam | H02K 15/022 | |
| 2018/0159389 | A1 * | 6/2018 | Nishikawa | H02K 1/148 | |
| 2018/0278138 | A1 * | 9/2018 | Satou | H02K 41/02 | |
| 2019/0157921 | A1 * | 5/2019 | Nishikawa | H02K 1/146 | |
| 2019/0305654 | A1 * | 10/2019 | Matsubayashi | H01F 41/02 | |
| 2019/0363621 | A1 * | 11/2019 | Myojin | H02K 15/12 | |
| 2020/0269678 | A1 * | 8/2020 | Okabe | H02K 5/1732 | |
| 2020/0403460 | A1 * | 12/2020 | Higashiyama | H02K 21/22 | |
| 2021/0408849 | A1 * | 12/2021 | Egashira | H02K 15/021 | |
| 2022/0077726 | A1 * | 3/2022 | Le Berr | H02K 5/207 | |

OTHER PUBLICATIONS

International Search Report and Written Opinion for International App. PCT/EP2022/054218 mailed Jul. 7, 2022.

* cited by examiner

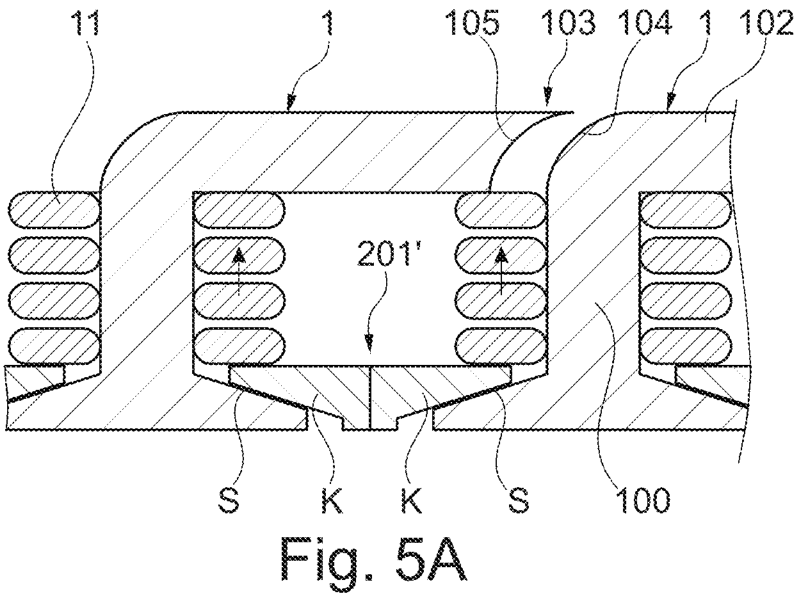
Fig. 5A
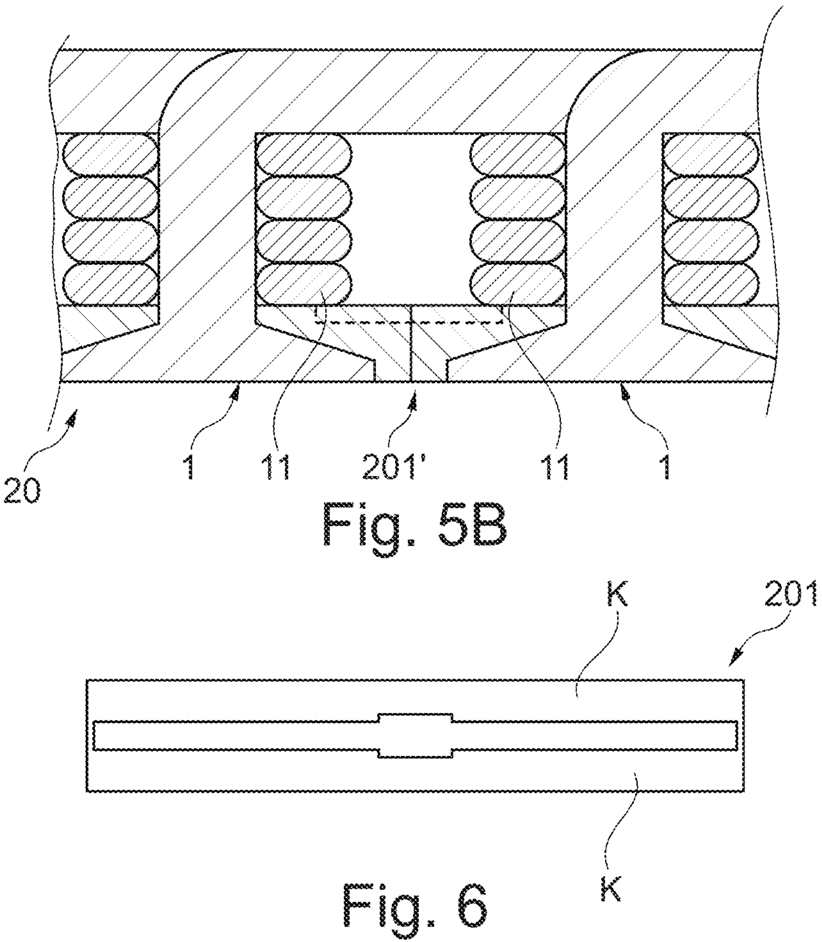
Fig. 5B
Fig. 6

SEGMENTED COIL CARRIER WITH GROOVE WEDGES MADE OF MULTIPLE PIECES

This application is the National Stage of International Application No. PCT/EP2022/054218, filed Feb. 21, 2022, which claims the benefit of German Patent Application No. DE 10 2021 201 793.2, filed Feb. 25, 2021. The entire contents of these documents are hereby incorporated herein by reference.

BACKGROUND

The present disclosure relates to a segmented coil carrier and a method for producing a segmented coil carrier.

In the case of electric motors and other electric machines, the aim is to continuously improve the target variables of energy efficiency, power-to-weight ratio, reliability, and service life. However, some of these target variables conflict with each other and with other requirements. In vehicle construction, for example, not only energy efficiency but also installation space requirements due to limited available space are to the fore. For low energy consumption in mobile applications (e.g., in cars or trains), a low weight of the drives is also important. The requirements described apply especially to use in aircraft, where, for example, the future of the electrification of aircraft propulsion systems depends decisively on the power density of the engines or generators to be used.

Any increase in the continuous power density of electric motors is significantly limited by the proportion of conductors in the coil winding.

A regular difficulty is to keep electrical losses as low as possible. If solid wires are used as coils, significant eddy current losses may be added to the ohmic losses. In a stator, for example, the windings of the coils closest to the rotor may be most greatly affected by eddy current losses. These losses lead to heating of the conductors. In this way, the winding of the coils closest to the rotor may limit the performance achievable by the electric machine. Windings further away however still have thermal reserves, so that the total power potential of the coils as a whole cannot be fully exploited.

Typically, the coils may also be moved by mechanical and electromagnetic forces and vibrations. Movements even in the micron range may be sufficient in the long term to damage a conductor insulation. To prevent this, in practice, coils are frequently cast in resin. However, this usually also leads to thermal isolation of the coil, so that the above-described problem of conductor heating is further aggravated. Further, even very small displacements of the conductors in the range of tenths of a millimeter may lead to a significant rise in losses. Such undesired displacements may occur both in production and subsequently during operation.

SUMMARY AND DESCRIPTION

The scope of the present invention is defined solely by the appended claims and is not affected to any degree by the statements within this summary.

The present embodiments may obviate one or more of the drawbacks or limitations in the related art. For example, improved electric machines are provided.

According to one aspect, a segmented coil carrier for an electric machine is specified. The segmented coil carrier includes a plurality of separately formed, interconnected segments each with a carrier with a shaft and a coil surrounding the shaft. A groove is formed (e.g., in each case) between two adjacent carriers, and a groove wedge is arranged in the groove (e.g., a groove wedge in each groove between every adjacent pair of carriers).

This is based on the knowledge that a groove wedge introduced into the groove in a segmented coil carrier assembled from a plurality of segments may prevent movements of the coils of the segments in the region of the grooves, without hindering a heat dissipation from the coils. Thus, a lighter and/or more powerful electric machine may be provided.

The groove wedge may be adapted to a contour of the groove and/or of the coil. Thus, gaps may be filled particularly efficiently. The groove may have a longitudinal axis running along the groove. For example, one of the segments is arranged on one side of the longitudinal axis of the groove, and a second of the segments, adjacent thereto, is arranged on the opposite side of the longitudinal axis. The shape of the groove wedge may be adapted to the contour of the groove and/or of the coil relative to a cross-sectional plane perpendicular to the longitudinal axis, and/or relative to a cross-sectional plane parallel to the longitudinal axis. Thus, for example, an axial form fit may be provided (e.g., achieved by axial cross-sectional changes of the groove (relative to the longitudinal axis of the groove)).

Specifically, each of the two adjacent carriers may have a holding portion, and the groove wedge may be adapted to the shape of the holding portions of the two adjacent carriers.

The groove wedge has at least one (e.g., two) wedge-shaped portions. In this way, the groove wedge may exert a pressure on the coils via the wedge effect, in order to position and fix these.

Optionally, the groove wedge is formed from multiple pieces. This allows the pieces of a groove wedge to be inserted before the segments are assembled into the segmented coil carrier. In one embodiment, the pieces of the groove wedge (e.g., one piece and another piece of the groove wedge) are separated in a radially running plane. The term “radial” relates to a rotational axis around which the segmented coil carriers are arranged. A radially running plane describes a plane extending from a rotational axis, approximately in one direction (e.g., a single radial direction). Pieces of a groove wedge that are separate in a radially running plane are arranged adjacent to one another, relative to the rotational axis, in the tangential direction.

In a refinement, at least two pieces of the groove wedge stand in form-fit engagement with one another via a form-fit contour. This allows a particularly secure fixing of the pieces of the groove wedge.

The groove wedge may be pretensioned against the coils of two adjacent carriers for a particularly effective fixing of the coils.

Optionally, the groove wedge has a cutout extending below the coils of the two adjacent carriers, or, in general, a shape such that the groove wedge touches the coils only on a part portion of the face directed towards the groove wedge. A cooling medium may flow through the cutout. This may provide that the coils are cooled by a cooling medium over a larger area.

The segments are, for example, arranged around a common axis. Optionally, the segments are arranged such that the holding portions of all segments are oriented towards the common axis.

According to one aspect, an electric machine is provided. The electric machine includes the segmented coil carrier according to any embodiment described herein. The electric machine may thus be made particularly efficient, reliable, and durable.

For example, the electric machine further includes a rotor, where the segmented coil carrier forms a stator of the electric machine.

In one embodiment, the electric machine is configured as an electric motor. Alternatively or additionally, the electric machine is configured as a generator. In general, the electric machine may be an electromagnetic energy converter. For example, the electric machine may be configured as a rotating or as a linearly movable machine. Alternatively, the electric machine may also be configured as a transformer, an induction coil (e.g., for charging electrical devices, such as electric cars), or as an induction oven. The segment or segments may be arranged on a primary part and/or a secondary part of the electric machine.

According to one aspect, an aircraft is provided. The aircraft includes at least one engine with an electric machine according to any embodiment described herein. The described advantages are particularly applicable to aircraft. The engine is configured to drive the aircraft (e.g., to generate thrust).

According to one aspect, a method for producing a segmented coil carrier is provided (e.g., the segmented coil carrier according to any embodiment described herein). The method includes the provision of a plurality of separately formed segments each having a carrier with a shaft and a coil surrounding the shaft, and connection of the plurality of segments such that a groove, in which a groove wedge is or will be arranged, is formed between two adjacent carriers.

With respect to the advantages of the method, reference is made to the above statements concerning the segmented coil carrier.

Optionally, the groove wedge is formed of multiple pieces. A piece of the groove wedge may be arranged on each of two adjacent carriers even before interconnection of the segments. This may simplify production (e.g., for cross-sectional profiles that are not axially constant).

Optionally, each of the two adjacent carriers has a holding portion with a chamfer, where on connection of the plurality of segments, the groove wedge slides along the chamfers and is thereby pressed against the coils arranged on the two adjacent carriers. Following the interconnection of the segments, the coils may thus be compressed, and the windings may be protected against tilting and slipping.

BRIEF DESCRIPTION OF THE DRAWINGS

FIGS. 5A, 5B show a plurality of segments according to FIG. 1 before interconnection to form a segmented coil carrier, where a multipiece groove wedge that is configured to compress coils of the plurality of segments is shown;

FIG. 6 shows one embodiment of a groove wedge having a cross-sectional profile that differs along a length of the groove wedge;

DETAILED DESCRIPTION

Figure 1:
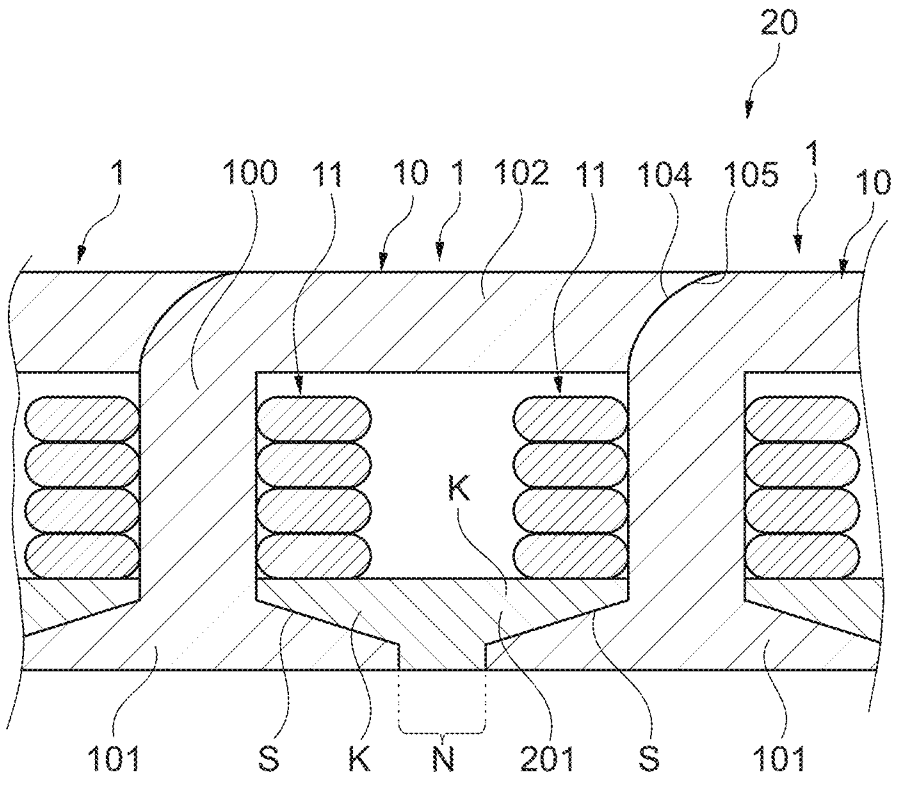
FIG. 1 shows one embodiment of a segmented coil carrier for an electric machine with a plurality of segments and groove wedges.

FIG. 1 shows a segmented coil carrier 20 having a plurality of segments 1. Each segment 1 of the plurality of segments 1 includes a carrier 10 and an electric coil 11. A groove N is formed between each pair of adjacent segments 1 of the plurality of segments 1 and is filled by a groove wedge 201. The plurality of segments 1 are all formed identically.

The carrier 10 of each segment 1 of the plurality of segments 1 has a shaft 100, a holding portion 101, and a further portion 102.

The shaft 100 is configured to be surrounded by the coil 11. The shaft 100 has outer surfaces. The coil 11 extends around the shaft 100 along outer faces. The outer surfaces of the shaft 100 extend from a first end of the shaft 100 to a second end of the shaft 100 (e.g., parallel to a coil axis around which the coil 11 surrounding the shaft 100 is wound). The shaft 100 may have a depth perpendicular to this coil axis (e.g., pointing into the image plane of FIG. 1A), which is as large as a width schematically illustrated in FIG. 1A, or which is alternatively larger or smaller than the width (e.g., substantially larger). The shaft 100 may therefore be configured to be elongate in the direction of the depth perpendicularly to the coil axis.

The holding portion 101 adjoins the shaft 100 at the first end of the shaft 100 and is configured to secure the coil 11 surrounding the shaft 100 on the shaft 100 (e.g., to hold the coil 11 thereon). The holding portion 101 has a greater width than the shaft 100. Specifically, the holding portion 101 projects from the shaft 100 in two opposite directions. Thus, the coil 11 surrounding the shaft 100 may be securely held thereon by positive engagement. The holding portion 101 projects beyond the coil 11 (e.g., on at least two opposite sides). The holding portion 101 has two flanks that adjoin opposite outer surfaces of the shaft 100. These flanks extend at an angle to one another and at an angle to the coil axis defined by the shaft 100. The flanks are aligned in a V-shape with respect to one another. Thus, each of the flanks describes a chamfer S.

The shaft 100 and the holding portion 101 together describe the shape of a T. The holding portion 101 projects from the shaft 100 in the form of a mushroom head.

In the present case, the holding portion 101 serves as a tooth head. The holding portion 101 is provided to face a component mounted so as to be movable relative to the carrier 10.

The further portion 102 projects from the shaft 100 on one side at the other, second end of the shaft 100 (e.g., at an angle to the shaft 100, such as at a right angle). In the present case, the further portion 102 extends in a straight line and in a plane at an angle (e.g., perpendicularly) to the coil axis. Away from the shaft 100, the further portion 102 has an open end 103. The shaft 100 and the further portion 102 together describe the shape of an L.

The coil 11 in this case includes, for example, a wire wound in a single-layer in the form of a flat conductor.

The carrier 10 is of one-piece design. The carrier 10 is not composed of a plurality of elements but is formed from a single piece of material. The carrier 10 thus has no joining surfaces. Alternatively, the carrier 10 is laminated (e.g., consists of a plurality of sheet metal blanks, such as congruent sheet metal blanks). Each of the sheet metal blanks then includes a part of the shaft 100, of the holding portion 101, and of the further portion 102 (e.g., these are always connected integrally to one another, even in the case of a laminated design). In both alternatives, the carrier 10 is free of joining surfaces between the shaft 100 and the holding portion 101, and between the shaft 100 and the further portion 102.

The further portion 102 serves as a connecting portion for attachment to two adjacent, analogously configured segments 1. The open end 103 constitutes, for example, a connecting region that is connected to an adjacent segment 1. In one embodiment, the open end 103 of a segment 1 is in each case connected to a transitional region between the shaft 100 and the further portion 102 of an adjacent segment 1. The segmented coil carrier 20 is shown in a linear configuration and may also be used in this form (e.g., for a linear drive). Alternatively, the segmented coil carrier 20 may be of circular configuration. For this purpose, the segments 1 are either fastened to one another at an angle to one another, or the segments 1 are inserted into a sleeve, for example. The segments 1 may be connected together rigidly or movably. The segmented coil carrier 20 may also be referred to as a pole chain. For example, a stator is produced in the pole chain method from the segmented coil carrier 20. For this purpose, multiple segments 1 are arranged in a chain and then brought into a predetermined arrangement relative to one another and fixed relative to one another (e.g., by an outer ring).

The carrier 10 of the segment 1 has two rounded portions 104, 105. Specifically, the carrier 10 has a rounded portion 104 at the transition between the shaft 100 and the further portion 102. The rounded portion 104 is convex. In the example shown, the rounded portion 104 is in the form of an arc of a circle. The rounded portion 104 has a radius of curvature that corresponds (e.g., exactly, approximately, or at least), for example, to the material thickness of the shaft 100 and/or of the further portion 102. Further, the carrier 10 has a further rounded portion 105 that, in the present case, is formed at the open end 103 of the further portion 102. This rounded portion 105 is concave. This rounded portion 105 is configured to match the rounded portion 104 at the transition between the shaft 100 and the further portion 102. The shapes of the two rounded portions 104, 105 fit into one another. As a result, adjacent segments 1 may be brought into surface-to-surface contact with one another, without an air gap, at the matching rounded portions 104, 105. This allows an efficient conduction of the magnetic fields of the carriers 11.

The groove wedge 201 is inserted in the groove N between the holding portions 101. The groove wedge 201 includes two wedge-shaped portions K, each of which is arranged between the chamfer S of the respective holding part and the coil 11, specifically wedged in-between. Thus, the groove wedge 201 is pretensioned against the coils 11 and presses against these. This particularly effectively prevents movements of the coil windings. The wedge-shaped portions K face away from one another. A protruding web is formed between the two wedge-shaped portions, arranged in the gap between the ends of the holding parts 101. The groove wedge 201 is thus adapted to the contour of the groove N and fixes the conductors of the coils 11 in the direction of the coil axis. At the side, the coils 11 are supported by the shaft 100. The groove wedge 201 has a shape that tapers on both sides.

Optionally, the groove wedge 201 is made of a thermally and/or magnetically conductive material (e.g., includes a metal such as iron).

Figures 2, 3, 4:
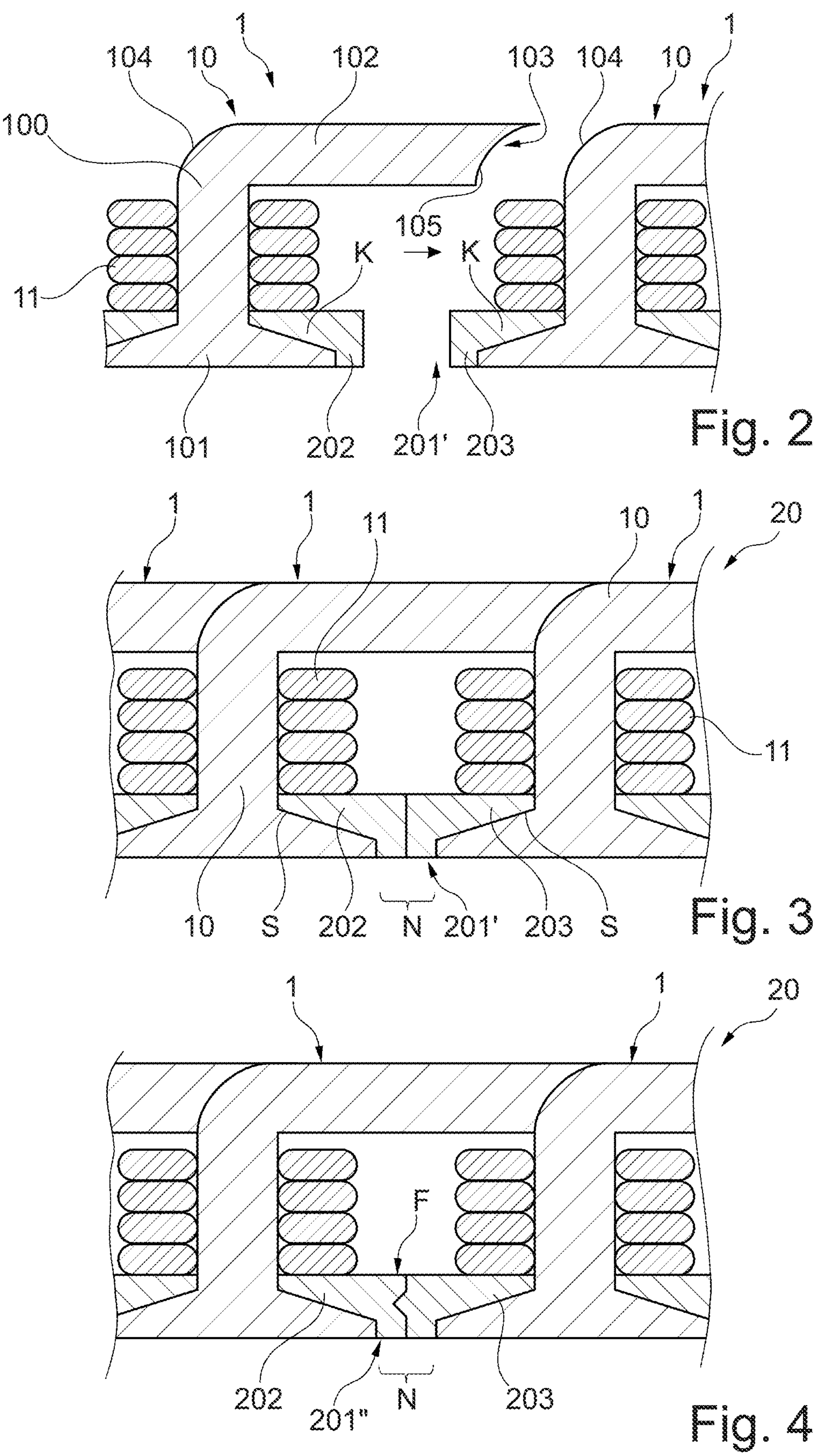
FIG. 2 shows a plurality of segments according to FIG. 1 before interconnection to form a segmented coil carrier, where a multipiece groove wedge is shown.
FIG. 3 shows the segmented coil carrier after interconnection of the plurality of segments according to FIG. 2.
FIG. 4 shows one embodiment of a segmented coil carrier with a grooved wedge including multiple pieces in form-fit engagement with one another.

In the embodiment of FIG. 2, the groove wedge 201' is made from multiple pieces (e.g., two pieces). FIG. 2 shows two separate segments 1 before the two separate segments 1 are fastened together at the above-mentioned rounded portions 104, 105. One piece 202 of the groove wedge 201' is premounted on a segment 1, and the other piece 203 is premounted on the other segment 1. The wedge-shaped portions K have already been pushed between the widened end portion of the respective holding portion 101 and the associated coil 11. The piece 202 and the other piece 203 are separated from one another in an approximately radially running plane. A radially running plane or radial plane describes a plane extending from the rotational axis R in a radial direction, and in the illustration of FIG. 2, has a linear extent, extending perpendicularly to the plane of the drawing. The radially running plane forms a plane of symmetry between the shaft 100 of the first segment 1 shown and the shaft of the second segment 1 shown.

When the segments 1 are moved towards one another and fastened together, the pieces 202, 203 of the groove wedge 201 are pressed against one another so that the pieces 202, 203 of the groove wedge 201 slide along the chamfers S and fix the coils 11 by the wedge effect.

Multipiece groove wedges 201 may, for example, be used when the segmented coil carrier 20 has a cross-sectional profile that changes axially (e.g., due to axially terminating winding end carriers).

This state, assembled into the segmented coil carrier 20, is illustrated in FIG. 3.

FIG. 4 shows an alternative embodiment of a multipiece (e.g., two-piece) groove wedge 201" in which the two pieces 202, 203 are in engagement with one another via a form-fit contour F. The two pieces 202, 203 are in form-fit engagement via the form-fit contour F. The form-fit contour F includes at least one protrusion on one of the two pieces 202, 203 that engages in a depression on the other of the two pieces 202, 203. This may prevent a movement of the two pieces 202, 203 of the groove wedge 201".

FIG. 5A again shows two segments 1 before assembly. The individual windings of the coils 11 still have a slight play. The groove wedge 201' is inserted in the groove N but is not yet pushed fully in.

When the segments 1 are moved towards one another, the wedge-shaped portions K slide along the chamfers S more deeply between the respective coil 11 and the head of the holding portion 101. Thus, the groove wedge 201' presses the windings of the coils 11 against one another, as illustrated in FIG. 5B. This compresses the coils 11. Thus, a greater fill factor may be achieved with simultaneously improved heat dissipation. Also, conductors displaced by the winding process or by inherent stresses may be positionally improved by the groove wedge 201'. For example, the conductors may be protected against tilting and slipping. This may prevent an increase in losses due to a less favorable position in the electromagnetic field, and provide that contact with the cooling medium is not reduced.

The segmented coil carrier 20 constitutes, for example, a pole chain with which a stator may be produced, for example, in the pole chain method.

FIGS. 5A and 5B show, purely as an example, a two-piece groove wedge 201'. The groove wedge may consist of one piece or be divided into two or more pieces formed symmetrically or asymmetrically to one another. The groove wedge 201' closes the groove between two segments 1 and may therefore also be described as a closing wedge.

Optionally, the groove wedge 201' has a cross-sectional profile that varies in its longitudinal direction (e.g., into the image plane in FIGS. 1 to 5B) and may be adapted to the contour of the groove. This may achieve an axial form fit and hence an axial fixing.

FIG. 5B further shows in dotted lines an optional cutout of the groove wedge 201'. The cutout may be provided on a side facing the coils 11, according to FIG. 5B. The cutout is configured, for example, as a box-like recess. In this case, the cutout is arranged between the two coils and extends below each coil. In general, the groove wedge 201' may have a profile that varies in the axial cross-section. Thus, it is possible, for example, to improve the cooling of the lower conductor because a cooling medium may flow over a larger area around the lower conductor. In all variants, a cooling medium may flow through a gap between adjacent coils 11 (e.g., a cooling medium may be arranged in the gap). The cutout is formed in FIG. 5B by both pieces of the groove wedge 201'. Such a cutout may be provided, however, not only in multipiece, but also in one-piece groove wedges. Optionally, the groove wedge 201' has a web with widened center between the two wedge-shaped portions K.

FIG. 6 illustrates an example of such a varying cross-sectional profile. The groove wedge 201' accordingly includes a web with widened center between the two wedge-shaped portions K.

Optionally, after fixing by the groove wedge 201, 201', 201", the coils 11 are additionally impregnated or coated (e.g., by a resin). Alternatively or additionally, the groove wedge 201, 201', 201" is itself fixed by adhesion, impregnation, or encapsulation.

The described use of the groove wedge 201, 201', 201", for example, allows losses in the lower winding to be permanently limited to a fixed maximum value, whereby the performance of the machine may be effectively increased. Vibrations of the wires 110 of the coils 11 and the associated abrasion of a coating may be reduced. Accordingly, the reliability and safety of the electric machine formed therewith may be increased.

The wire 110 is, for example, a solid wire, but alternatively, for example, braided conductors may be used.

Figure 7:
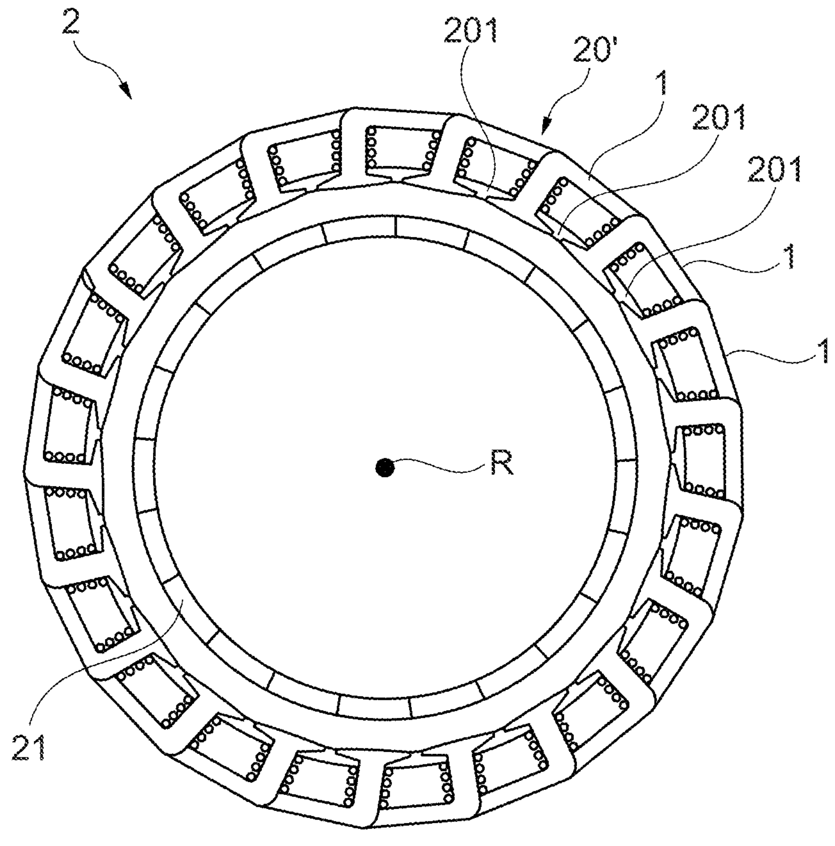
FIG. 7 shows one embodiment of an electric machine in the form of an electric motor having a segmented coil carrier with a plurality of segments according to FIG. 1.
Figure 8:
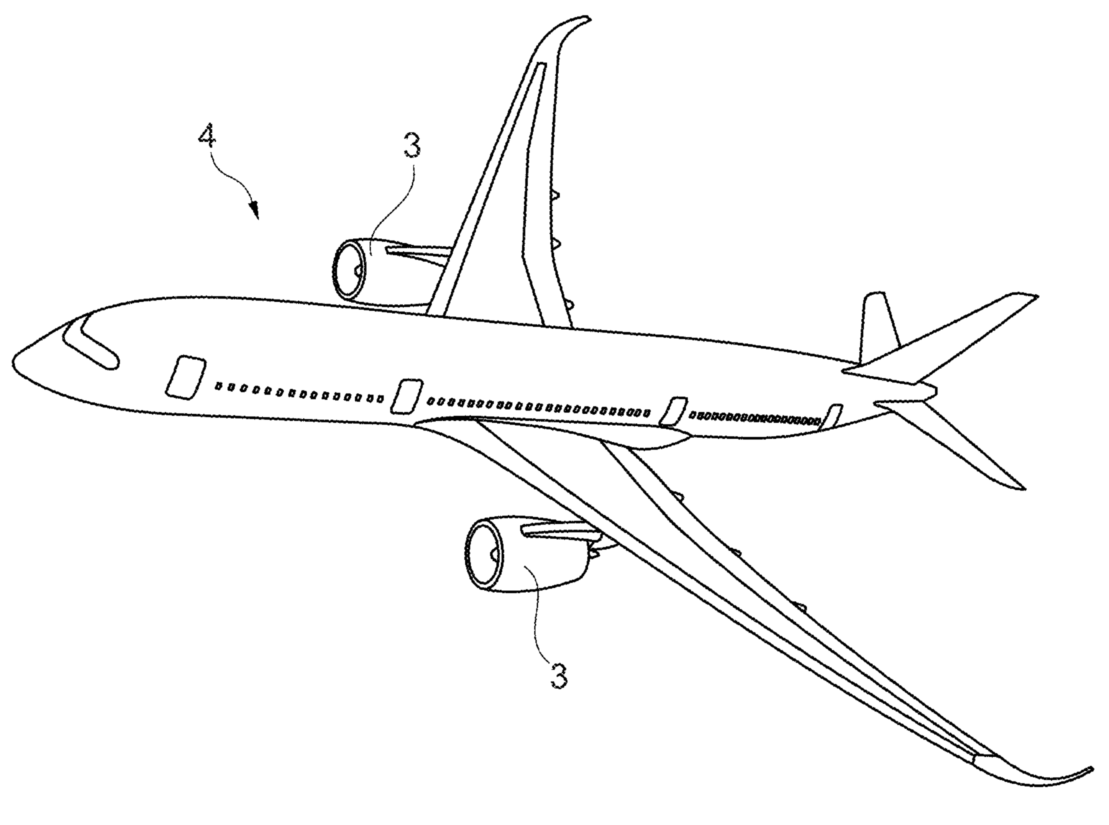
FIG. 8 shows one embodiment of an aircraft in the form of an airplane having a plurality of engines.

FIG. 7 shows the segmented coil carrier 20 in an annular arrangement. In one embodiment, the individual segments 1 with the plurality of groove wedges 201 are arranged concentrically around an axis of rotation R. The segments 1 are fixed to one another and/or fixed relative to one another by a holding device (e.g., a sleeve). The segmented coil carrier 20 forms a stator of an electric machine 2 in the form of an electric motor. The electric machine 2 further includes a rotor 21 arranged within the segmented coil carrier 20. The rotor 21 is rotatable about the axis of rotation R relative to the segmented coil carrier 20. The rotor 21 includes a number of permanent magnets. The rotor 21 may be rotated relative to the stator about the axis of rotation R by an electric current flow through the coils 11.

FIG. 7 shows an aircraft 4 in the form of an airplane. The aircraft 4 includes wings and a plurality of engines 3. Each engine of the plurality of engines 3 includes an electric motor according to FIG. 6. Optionally, at least one starter generator of one engine of the plurality of engines 3 and/or an optional auxiliary turbine with a generator includes a segmented coil carrier 20 according to any embodiment described herein.

It is understood that the invention is not restricted to the embodiments described above, and various modifications and improvements may be made without departing from the concepts described herein. Any of the features may be used separately or in combination with any other features, unless they are mutually exclusive, and the disclosure extends to and includes all combinations and subcombinations of one or more features that are described herein.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A segmented coil carrier for an electric machine, the segmented coil carrier comprising:

a plurality of segments that are separately formed and interconnected, each segment of the plurality of segments having a carrier with a shaft, a holding portion at a first end of the shaft, and a further portion extending away from a second end of the shaft, at an angle relative to the shaft, and having a coil surrounding the shaft, wherein a groove is formed between two adjacent carriers of the carriers; and a groove wedge arranged in the groove, wherein the groove wedge is formed from multiple pieces, wherein the further portion has an open end, wherein a shape of the open end of a first segment of the plurality of segments matches a shape of a transition between the shaft and the further portion of a second segment of the plurality of segments, and the open end of the first segment is in contact with the transition of the second segment.

2. The segmented coil carrier of claim 1, wherein the groove wedge is adapted to a contour of the groove.

3. The segmented coil carrier of claim 1, wherein each of the two adjacent carriers has a holding portion protruding from the shaft, and the groove wedge is adapted to a form of the holding portions of the two adjacent carriers.

4. The segmented coil carrier of claim 1, wherein the groove wedge has two opposite wedge-shaped portions.

5. The segmented coil carrier of claim 1, wherein one piece and another piece of the groove wedge are separated in a radially running plane.

6. The segmented coil carrier of claim 1, wherein at least two pieces of the groove wedge are in mutual engagement via a form-fit contour.

7. The segmented coil carrier of claim 1, wherein the groove wedge is pretensioned against the coils of the two adjacent carriers.

8. The segmented coil carrier of claim 1, wherein the groove wedge has a cutout extending below the coils of the two adjacent carriers.

9. The segmented coil carrier of claim 1, wherein the plurality of segments are arranged around a common axis.

10. The segmented coil carrier of claim 1, wherein the angle at which the further portion extends away from the second end of the shaft is a right angle.

11. An electric machine comprising:

a segmented coil carrier comprising:

a plurality of segments that are separately formed and interconnected, each segment of the plurality of segments having a carrier with a shaft, a holding portion at a first end of the shaft, and a further portion extending away from a second end of the shaft, at an angle relative to the shaft, and having a coil surrounding the shaft, wherein a groove is formed between two adjacent carriers of the carriers; and a groove wedge arranged in the groove, wherein the groove wedge is formed from multiple pieces, wherein the further portion has an open end, wherein a shape of the open end of a first segment of the plurality of segments matches a shape of a transition between the shaft and the further portion of a second segment of the plurality of segments, and wherein the open end of the first segment is in contact with the transition of the second segment.

12. The electric machine of claim 11, further comprising a rotor, wherein the segmented coil carrier forms a stator of the electric machine.

13. The electric machine of claim 11, wherein the electric machine is configured in the form of an electric motor.

14. A method for producing a segmented coil carrier, the method comprising:

providing a plurality of separately formed segments, each separately formed segment of the plurality of separately formed segments having a carrier with a shaft, a holding portion at a first end of the shaft, and a further portion extending away from a second end of the shaft, at an angle relative to the shaft, and having a coil surrounding the shaft; and connecting the plurality of separately formed segments, such that a groove, in which a groove wedge is arrangeable, is formed between two adjacent carriers of the carriers, wherein the groove wedge is formed from multiple pieces, wherein the further portion has an open end, wherein a shape of the open end of a first segment of the plurality of separately formed segments matches a shape of a transition between the shaft and the further portion of a second segment of the plurality of separately formed segments, and wherein the open end of the first segment is in contact with the transition of the second segment.

15. The method of claim 14, wherein before connecting the plurality of separately formed segments, a respective piece of the groove wedge is already arranged on each of the two adjacent carriers.

16. The method of claim 14, wherein each of the two adjacent carriers has a holding portion with a chamfer, wherein on the connecting of the plurality of separately formed segments, the groove wedge slides along the chamfers and is thereby pressed against the coils arranged on the two adjacent carriers.

17. An aircraft comprising:

an engine comprising:

an electric machine comprising:

a segmented coil carrier comprising:

a plurality of segments that are separately formed and interconnected, each segment of the plurality of segments having a carrier with a shaft, a holding portion at a first end of the shaft, and a further portion extending away from a second end of the shaft, at an angle relative to the shaft, and having a coil surrounding the shaft, wherein a groove is formed between two adjacent carriers of the carriers; and a groove wedge arranged in the groove, wherein the groove wedge is formed from multiple pieces, wherein the further portion has an open end, wherein a shape of the open end of a first segment of the plurality of segments matches a shape of a transition between the shaft and the further portion of a second segment of the plurality of segments, and wherein the open end of the first segment is in contact with the transition of the second segment.

* * * * *